United States Patent
Hashimoto et al.

(10) Patent No.: US 12,461,917 B2
(45) Date of Patent: Nov. 4, 2025

(54) SECURE EQUI-JOIN APPARATUS, SECURE EQUI-JOIN METHOD, AND PROGRAM

(71) Applicant: NTT, Inc., Tokyo (JP)

(72) Inventors: Junko Hashimoto, Tokyo (JP); Dai Ikarashi, Tokyo (JP)

(73) Assignee: NTT, Inc., Tokyo (JP)

( * ) Notice: Subject to any disclaimer, the term of this patent is extended or adjusted under 35 U.S.C. 154(b) by 101 days.

(21) Appl. No.: 18/572,808

(22) PCT Filed: Jul. 2, 2021

(86) PCT No.: PCT/JP2021/025131
§ 371 (c)(1),
(2) Date: Dec. 21, 2023

(87) PCT Pub. No.: WO2023/276142
PCT Pub. Date: Jan. 5, 2023

(65) Prior Publication Data
US 2024/0289335 A1    Aug. 29, 2024

(51) Int. Cl.
*G06F 16/2455* (2019.01)
*G06F 21/60* (2013.01)
*G06F 21/62* (2013.01)

(52) U.S. Cl.
CPC ........ *G06F 16/2456* (2019.01); *G06F 21/602* (2013.01); *G06F 21/6227* (2013.01)

(58) Field of Classification Search
CPC . G06F 16/2456; G06F 16/6227; G06F 21/602
See application file for complete search history.

(56) References Cited

U.S. PATENT DOCUMENTS

| | | | | |
|---|---|---|---|---|
| 10,642,856 | B1* | 5/2020 | Chu | G06F 16/2456 |
| 2013/0185280 | A1* | 7/2013 | Ma | G06F 16/2456 |
| | | | | 707/E17.054 |
| 2017/0300712 | A1* | 10/2017 | Timmerman | G06F 16/9535 |
| 2019/0220619 | A1* | 7/2019 | Loza | H04L 9/14 |
| 2019/0228010 | A1 | 7/2019 | Ikarashi et al. | |
| 2022/0382908 | A1* | 12/2022 | Buddhavarapu | G06F 21/6263 |
| 2024/0045985 | A1* | 2/2024 | Yang | G06F 21/6227 |

FOREIGN PATENT DOCUMENTS

WO        2018/061800 A1    4/2018

* cited by examiner

*Primary Examiner* — Apu M Mofiz
*Assistant Examiner* — J Mitchell Curran
(74) *Attorney, Agent, or Firm* — XSENSUS LLP

(57) ABSTRACT

A secret equi-join device uses as inputs a first concealed table that is concealed information of a first table having a plurality of keys and a second concealed table that is concealed information of a second table having a plurality of keys, obtains a first concealed additional table that is concealed information of a first additional table which is obtained by adding a subkey column to the first table, obtains by secure computation a second concealed additional table that is concealed information of a second additional table which is obtained by adding a subkey column further to a third table obtained by copying each record in the second table a plurality of times and adding the copied records, and obtains a concealed joined table that is concealed information of a joined table which is obtained by equi-joining the first additional table and the second additional table.

8 Claims, 11 Drawing Sheets

| [TL.Key] | [TL.V(0)] | ... | [TL.V(LVN-1)] |
|---|---|---|---|
| $[TL.Key_0]$ | $[TL.V(0)_0]$ | ... | $[TL.V(LVN-1)_0]$ |
| $[TL.Key_1]$ | $[TL.V(0)_1]$ | ... | $[TL.V(LVN-1)_1]$ |
| ... | ... | ... | ... |
| $[TL.Key_j]$ | $[TL.V(0)_j]$ | ... | $[TL.V(LVN-1)_j]$ |
| ... | ... | ... | ... |
| $[TL.Key_{LRN-1}]$ | $[TL.V(0)_{LRN-1}]$ | ... | $[TL.V(LVN-1)_{LRN-1}]$ |

| [TR.Key] | [TR.V(0)] | ... | [TR.V(RVN-1)] |
|---|---|---|---|
| $[TR.Key_0]$ | $[TR.V(0)_0]$ | ... | $[TR.V(RVN-1)_0]$ |
| $[TR.Key_1]$ | $[TR.V(0)_1]$ | ... | $[TR.V(RVN-1)_1]$ |
| ... | ... | ... | ... |
| $[TR.Key_p]$ | $[TR.V(0)_p]$ | ... | $[TR.V(RVN-1)_p]$ |
| ... | ... | ... | ... |
| $[TR.Key_{RRN-1}]$ | $[TR.V(0)_{RRN-1}]$ | ... | $[TR.V(RVN-1)_{RRN-1}]$ |

[TLs]

| [TL.Key] | [TLs.S] | [TLs.V(0)] | ... | [TLs.V(LVN-1)] |
|---|---|---|---|---|
| [TL.Key$_0$] | [TLs.S$_0$] | [TL.V(0)$_0$] | ... | [TL.V(LVN-1)$_0$] |
| [TL.Key$_1$] | [TLs.S$_1$] | [TL.V(0)$_1$] | ... | [TL.V(LVN-1)$_1$] |
| ... | ... | ... | ... | ... |
| [TL.Key$_j$] | [TLs.S$_j$] | [TL.V(0)$_j$] | ... | [TL.V(LVN-1)$_j$] |
| ... | ... | ... | ... | ... |
| [TL.Key$_{LRN-1}$] | [TLs.S$_{LRN-1}$] | [TL.V(0)$_{LRN-1}$] | ... | [TL.V(LVN-1)$_{LRN-1}$] |

FIG. 5B

[TRc]

| [TRc.Key] | [TRc.V(0)] | ... | [TRc.V(RVN-1)] |
|---|---|---|---|
| [TR.Key$_0$] | [TR.V(0)$_0$] | ... | [TR.V(RVN-1)$_0$] |
| [TR.Key$_1$] | [TR.V(0)$_1$] | ... | [TR.V(RVN-1)$_1$] |
| ... | ... | ... | ... |
| [TR.Key$_p$] | [TR.V(0)$_p$] | ... | [TR.V(RVN-1)$_p$] |
| ... | ... | ... | ... |
| [TR.Key$_{RRN-1}$] | [TR.V(0)$_{RRN-1}$] | ... | [TR.V(RVN-1)$_{RRN-1}$] |

K

| [TRs]              |                          |                  |     |                        |
|--------------------|--------------------------|------------------|-----|------------------------|
| [TRs.Key]          | [TRs.S]                  | [TRs.V(0)]       | ... | [TRs.V(RVN-1)]         |
| [TR.Key$_0$]       | [TRs.S$_0$]              | [TR.V(0)$_0$]    | ... | [TR.V(RVN-1)$_0$]      |
| ...                | ...                      | ...              | ... | ...                    |
| [TR.Key$_0$]       | [TRs.S$_{K-1}$]          | [TR.V(0)$_0$]    | ... | [TR.V(RVN-1)$_0$]      |
| ...                | ...                      | ...              | ... | ...                    |
| [TR.Key$_p$]       | [TRs.S$_{p*K}$]          | [TR.V(0)$_p$]    | ... | [TR.V(RVN-1)$_p$]      |
| ...                | [TRs.S$_{(p+1)*K-1}$]    | [TR.V(0)$_p$]    | ... | [TR.V(RVN-1)$_p$]      |
| [TR.Key$_{RRN-1}$] | [TRs.S$_{(RRN-1)*K}$]    | [TR.V(0)$_{RRN-1}$] | ... | [TR.V(RVN-1)$_{RRN-1}$] |
| ...                | ...                      | ...              | ... | ...                    |
| [TR.Key$_{RRN-1}$] | [TRs.S$_{RRN*K-1}$]      | [TR.V(0)$_{RRN-1}$] | ... | [TR.V(RVN-1)$_{RRN-1}$] |

FIG. 6

FIG. 7A
■BEVERAGE PRODUCT NAME

| ID | BEVERAGE PRODUCT NAME |
|---|---|
| [1000] | [MINERAL WATER A] |
| [4050] | [BLACK COFFEE B] |
| [3210] | [ORANGE JUICE C] |

FIG. 7B
■CAPACITY

| ID | CAPACITY |
|---|---|
| [1000] | [200] |
| [1000] | [500] |
| [1000] | [1000] |
| [4050] | [200] |
| [3210] | [500] |

FIG. 7C
■CONTAINER TYPE

| ID | CONTAINER |
|---|---|
| [1000] | [PET BOTTLE] |
| [1000] | [ALUMINUM CAN] |
| [4050] | [PET BOTTLE] |
| [4050] | [ALUMINUM CAN] |
| [3210] | [ALUMINUM CAN] |

FIG. 7D
■BEVERAGE PRODUCT LIST

| ID | BEVERAGE PRODUCT NAME | CAPACITY | CONTAINER |
|---|---|---|---|
| [1000] | [MINERAL WATER A] | [200] | [PET BOTTLE] |
| [1000] | [MINERAL WATER A] | [200] | [ALUMINUM CAN] |
| [1000] | [MINERAL WATER A] | [500] | [PET BOTTLE] |
| [1000] | [MINERAL WATER A] | [500] | [ALUMINUM CAN] |
| [1000] | [MINERAL WATER A] | [1000] | [PET BOTTLE] |
| [1000] | [MINERAL WATER A] | [1000] | [ALUMINUM CAN] |
| [4050] | [BLACK COFFEE B] | [200] | [PET BOTTLE] |
| [4050] | [BLACK COFFEE B] | [200] | [ALUMINUM CAN] |
| [3210] | [ORANGE JUICE C] | [500] | [ALUMINUM CAN] |

FIG. 9A

■CAPACITY + SEQUENCE NUMBER

| ID | SeqNo | CAPACITY |
|---|---|---|
| [1000] | [0] | [200] |
| [1000] | [1] | [500] |
| [1000] | [2] | [1000] |
| [4050] | [0] | [200] |
| [3210] | [0] | [500] |

FIG. 9B

■CONTAINER TYPE × k + SEQUENCE NUMBER

| ID | SeqNo | CONTAINER |
|---|---|---|
| [1000] | [0] | [PET BOTTLE] |
| [1000] | [1] | [PET BOTTLE] |
| [1000] | [2] | [PET BOTTLE] |
| [1000] | [0] | [ALUMINUM CAN] |
| [1000] | [1] | [ALUMINUM CAN] |
| [1000] | [2] | [ALUMINUM CAN] |
| [4050] | [0] | [PET BOTTLE] |
| [4050] | [1] | [PET BOTTLE] |
| [4050] | [2] | [PET BOTTLE] |
| [4050] | [0] | [ALUMINUM CAN] |
| [4050] | [1] | [ALUMINUM CAN] |
| [4050] | [2] | [ALUMINUM CAN] |
| [3210] | [0] | [ALUMINUM CAN] |
| [3210] | [1] | [ALUMINUM CAN] |
| [3210] | [2] | [ALUMINUM CAN] |

JOIN RESULT

| ID | SeqNo | CAPACITY | ID | SeqNo | CONTAINER |
|---|---|---|---|---|---|
| [1000] | [0] | [200] | [1000] | [0] | [PET BOTTLE] |
| [1000] | [0] | [200] | [1000] | [0] | [ALUMINUM CAN] |
| [1000] | [1] | [500] | [1000] | [1] | [PET BOTTLE] |
| [1000] | [1] | [500] | [1000] | [1] | [ALUMINUM CAN] |
| [1000] | [2] | [1000] | [1000] | [2] | [PET BOTTLE] |
| [1000] | [2] | [1000] | [1000] | [2] | [ALUMINUM CAN] |
| [4050] | [0] | [200] | [4050] | [0] | [PET BOTTLE] |
| [4050] | [0] | [200] | [4050] | [0] | [ALUMINUM CAN] |
| [3210] | [0] | [500] | [3210] | [0] | [ALUMINUM CAN] |

FIG. 10

SECURE EQUI-JOIN APPARATUS, SECURE EQUI-JOIN METHOD, AND PROGRAM

CROSS-REFERENCE TO RELATED APPLICATION

The present application is based on PCT filing PCT/JP2021/025131, filed Jul. 2, 2021, the entire contents of which are incorporated herein by reference.

TECHNICAL FIELD

The present invention relates to secure computation technology, and more particularly to secure equi-join technology that equi-joins two tables while keeping the information of the tables concealed.

BACKGROUND ART

In a general encryption scheme, even when data desired to be concealed is concealed (encrypted) and stored into a server, at the time of computation using that value, the data is restored (decrypted), and then the computation is performed. However, secure computation technology is technology that can perform computation while data is kept concealed. In the secure computation technology, a numerical value is converted into a plurality of shares with concealed values, a plurality of secure computation devices have the shares and perform addition, multiplication, logical operation, and the like without leaking information of their own shares (multi-party protocol).

In a case where computation is performed using a table stored in a database, a single table may not have all the information necessary for the computation, and information may be gathered from a plurality of tables to perform the computation. Such preprocessing of joining a plurality of tables is required. Patent Literature 1 discloses a technology to equi-join two tables while keeping the information of the tables concealed using an element (key) in a selected key column as a key attribute.

CITATION LIST

Patent Literature

Patent Literature 1: WO 2018/061800 A

SUMMARY OF INVENTION

Technical Problem

The technology of Patent Literature 1 can also be applied to a case where a key column in one of two tables to be equi-joined contains a plurality of keys (key attributes) of the same value.

However, the technology of Patent Literature 1 cannot be directly applied to a case where the key column in one table contains a plurality of keys of the same value, and the key column in the other table also contains a plurality of keys of the same value.

Here, assuming that the maximum number of keys of the same value (the maximum number of duplicates) contained in the key column in the one table is KL, an output can be obtained by dividing the one table into KL tables in each of which the key column does not include keys of the same value and using the technology of Patent Literature 1 to perform a secure equi-join KL times and combine KL tables output as a result.

However, it is difficult to divide the table while keeping the value concealed, and information regarding each divided table (e.g., information regarding the number of keys of the same value included in the table before the division) leaks in the process of dividing the table. Further, this method requires processing time for, in addition to the secure equi-join, the division of the table before the secure equi-join and the join of the tables after the secure equi-join. In particular, the table join processing cannot be parallelized, thus becoming a bottleneck in processing performance.

The present invention provides a technology that can equi-join two tables being equi-join targets at high speed while keeping the information of the tables concealed even when a key column in one of the two tables contains a plurality of keys of the same value and a key column in the other table also contains a plurality of keys of the same value.

Solution to Problem

The following processing is performed on a first concealed table that is concealed information of a first table including a first key column having a plurality of first keys and a first arbitrary element column having a plurality of first arbitrary elements, and a second concealed table that is concealed information of a second table including a second key column having a plurality of second keys and a second arbitrary element column having a plurality of second arbitrary elements.

A first subkey column addition unit obtains, by secure computation using the first concealed table, a first concealed additional table that is concealed information of a first additional table which is obtained by adding a first subkey column to the first table. Here, the first subkey column has a plurality of first subkeys, and each of the first keys is associated with any of the first subkeys. A maximum value of the number of the first keys of the same value contained in the first key column is KL, and KL is an integer of 2 or more. The first keys of the same value are associated with first subkeys of different values.

A second subkey column addition unit obtains, by secure computation using the second concealed table, a second concealed additional table that is concealed information of a second additional table which is obtained by adding a second subkey column to a third table. Here, the third table is a table which is obtained by adding a plurality of copied records, obtained by copying each record in the second table K times (where K≥KL), to the second table. The respective records in the second table include the respective second keys and the respective second arbitrary elements. The third table includes a third key column having a plurality of third keys that includes the second key and a copy of the second key, and a third arbitrary element column having a plurality of third arbitrary elements that include the second arbitrary element and a copy of the second arbitrary element. The second subkey column has a plurality of second subkeys. Each of the third keys is associated with any of the second subkeys. When the third key column contains the third keys representing the same common value as any of the first keys, at least some of the third keys representing the common value are associated with the second subkeys of the same value as the first subkeys associated with the first keys representing the common value.

The secure equi-join unit obtains, by secure computation using the first concealed additional table and the second concealed additional table, a concealed joined table that is concealed information of a joined table which is obtained by equi-joining the first additional table and the second additional table, using a pair of the first key and the first subkey as a key attribute of the first additional table and a pair of the third key and the second subkey as a key attribute of the second additional table.

Advantageous Effects of Invention

Therefore, it is possible to equi-join two tables being equi-join targets at high speed while keeping the information of the tables concealed even when a key column in one of the two tables contains a plurality of keys of the same value and a key column in the other table also contains a plurality of keys of the same value.

BRIEF DESCRIPTION OF DRAWINGS

FIG. 4A is a diagram illustrating a table 110 (first table) to be equi-joined. FIG. 4B is a diagram illustrating a table 120 (second table) to be equi-joined.

FIG. 5A is a diagram illustrating an additional table 130 (first additional table) which is obtained by adding a subkey column (first subkey column) to the table 110 (first table). FIG. 5B is a diagram illustrating a table 140 (third table) which is obtained by adding a plurality of copied records, obtained by copying each record in the table 120 (second table), to the table 120.

FIG. 6 is a view illustrating an additional table 150 (second additional table) which is obtained by adding a subkey column 151 (second subkey column) to the table 140 (third table).

FIGS. 7A to 7C are diagrams for illustrating tables to be equi-joined. FIG. 7D is a diagram illustrating a table obtained by equi-joining the tables of FIGS. 7A to 7C.

FIG. 9A is a view illustrating a table (first additional table) which is obtained by adding a sequence number (SeqNo) column (first subkey column) to the table (first table) in FIG. 7B. FIG. 9B is a diagram illustrating a table (second additional table) which is obtained by adding a plurality of copied records, obtained by copying each record in the table (second table) in FIG. 7C, to the table and further adding a sequence number column (second subkey column).

FIG. 10 is a view illustrating a table which is obtained by equi-joining the table (first additional table) in FIG. 9A and the table (second additional table) in FIG. 9B, using a pair of an identifier (ID) and a sequence number (SeqNo) as a key attribute.

DESCRIPTION OF EMBODIMENTS

Figure 1:
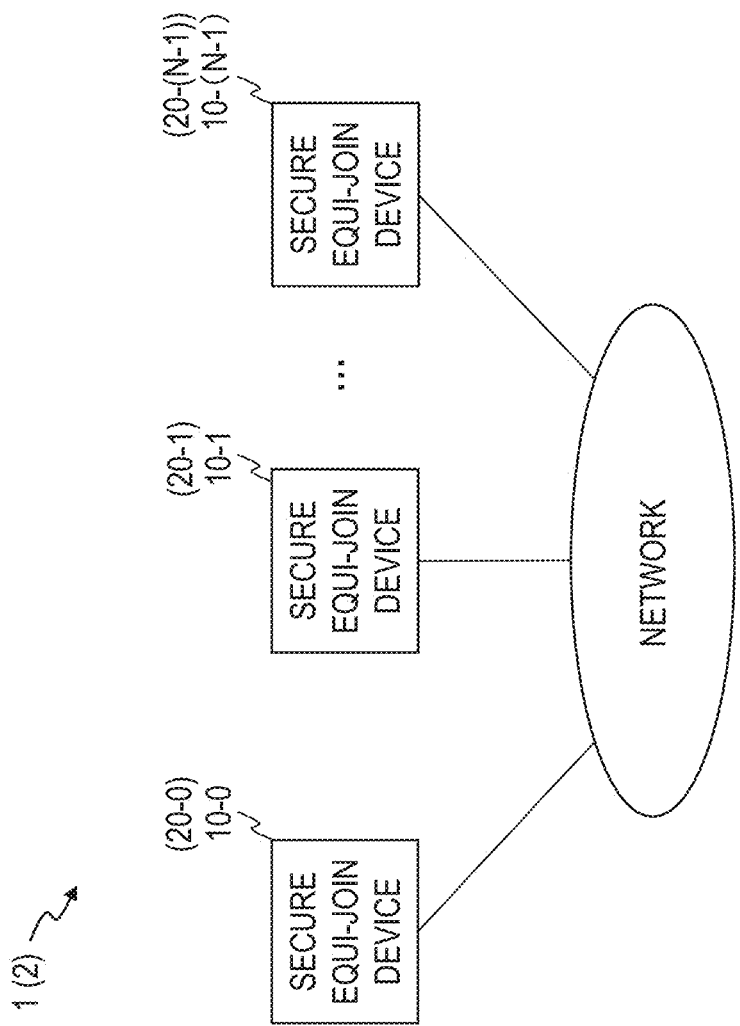
FIG. 1 is a block diagram illustrating a configuration of a secure equi-join system according to an embodiment.

Hereinafter, embodiments of the present invention will be described with reference to the drawings.

[Definition of Terms and Symbols]

Terms and symbols used in the present embodiment will be defined below.

The following symbols are used to denote tables.

T.X: a certain column X in a table T is denoted as T.X.

A j-th record in the table T is denoted as $T_j$. j is an integer of 0 or more.

A value in the column X of the j-th record in the table T is denoted as $T.X_j$.

Cross join: a cross join is also referred to as a cross join in Japanese and is a table join method to obtain a table TLR in which, for combinations of all records in two input tables TL, TR, a record $TL_j$ in the table TL and a record $TL_p$ in the table TR are associated with each other. Here, j is an integer of 0 or more, p is an integer of 0 or more, $j=0, \ldots, LRN-1$, $p=0, \ldots, RRN-1$, LRN is a positive integer representing the number of records in the table TL, and RRN is a positive integer representing the number of records in the table TR. That is, the table TLR being the cross-join result is a direct product of records ($TL_0, \ldots, TL_{LRN-1}$, and $TR_0, \ldots, TR_{RRN-1}$) in the table TL and the table TR. The number of records in the table TLR being the cross-join result between the table TL and the table TR is LRN*RRN. Here, "*" is an operator representing a product. In actual usage scenes, only records satisfying a certain condition are often extracted from the table TRL and used.

Equi-join: an equi-join is also referred to as an equivalence join or an inner join and is a table join method to obtain a table ETRL obtained by extracting, from the table TRL being the cross-join result of the two input tables TL, TR, only records with which the equal sign holds ($TL.Key_j=TR.Key_p$) for an attribute (key attribute $TL.Key_j$) selected from the table TL and an attribute (key attribute $TR.Key_p$) selected from the table TR. Note that the key attribute is an element of the selected column. That is, the equi-join is a table join method to obtain the table ETLR in which the record $TL_j$ in the table TL and the record $TL_p$ in the table TR are associated with each other for combinations of all records satisfying $TL.Key_j=TR.Key_p$ among the records in the two input tables $TL_p$, TR.

The following notation is used to denote concealed information.

[a]: the concealed information of "a" is denoted as [a]. For example, a ∈ Zn. A share obtained by performing secret sharing on "a" so as to enable secure computation may be [a] (e.g., refer to Reference Literature 1), or a ciphertext obtained by encrypting "a" so as to enable secure computation (a ciphertext of a homomorphic encryption) may be [a]. When "a" is subjected to secret sharing and divided into N (N is an integer of 1 or more) parties, N kinds of shares $[a]_0, \ldots [a]_{N-1}$ are obtained for "a", and secure computation is performed for each of the shares $[a]_0, \ldots [a]_{N-1}$. However, the algorithm for the secure computation is common for all the shares, so that the suffixes of $[a]_0, \ldots [a]_{N-1}$ are omitted, and only [a] is denoted.

Reference Literature 1: Koji Chida, Koki Hamada, Dai Igarashi, Katsumi Takahashi, "A Three-Party Secure Function Evaluation with Lightweight Verifiability Revisited", In CSS, 2010.

Zn: $Z_n$ represents a finite ring including a set of integers from 0 to n−1 (n is an integer of 1 or more).

[T]: the concealed information of a certain table T will be denoted as [T].

[T.X]: the concealed information of the column T.X is denoted as [T.X]. A concealed value is stored in each record (i.e., each field) of [T.X].

[T$_j$]: the concealed information of the record T; is denoted as [T$_j$]. A concealed value is stored in each column (i.e., each field) of [T$_j$].

[T.X$_j$]: the concealed information of a value T. X; in the column X of the j-th record in the table T is denoted as [T.X$_j$]. That is, the concealed information of the value of each field in the table T is stored in each field of [T].

First Embodiment

A first embodiment of the present invention will be described.

<Configuration>

As illustrated in FIG. 1, the secure equi-join system 1 of the present embodiment includes N pieces of secure equi-join devices 10-0, . . . , 10-(N−1). The secure equi-join devices 10-0, . . . , 10-(N−1) of the present embodiment are communicably connected via a network. Here, N is an integer of 2 or more (e.g., N=3) in a case where secure computation based on secret sharing is performed, and N is an integer of 1 or more (e.g., N=1) in a case where secure computation based on homomorphic encryption is performed.

Figure 2:
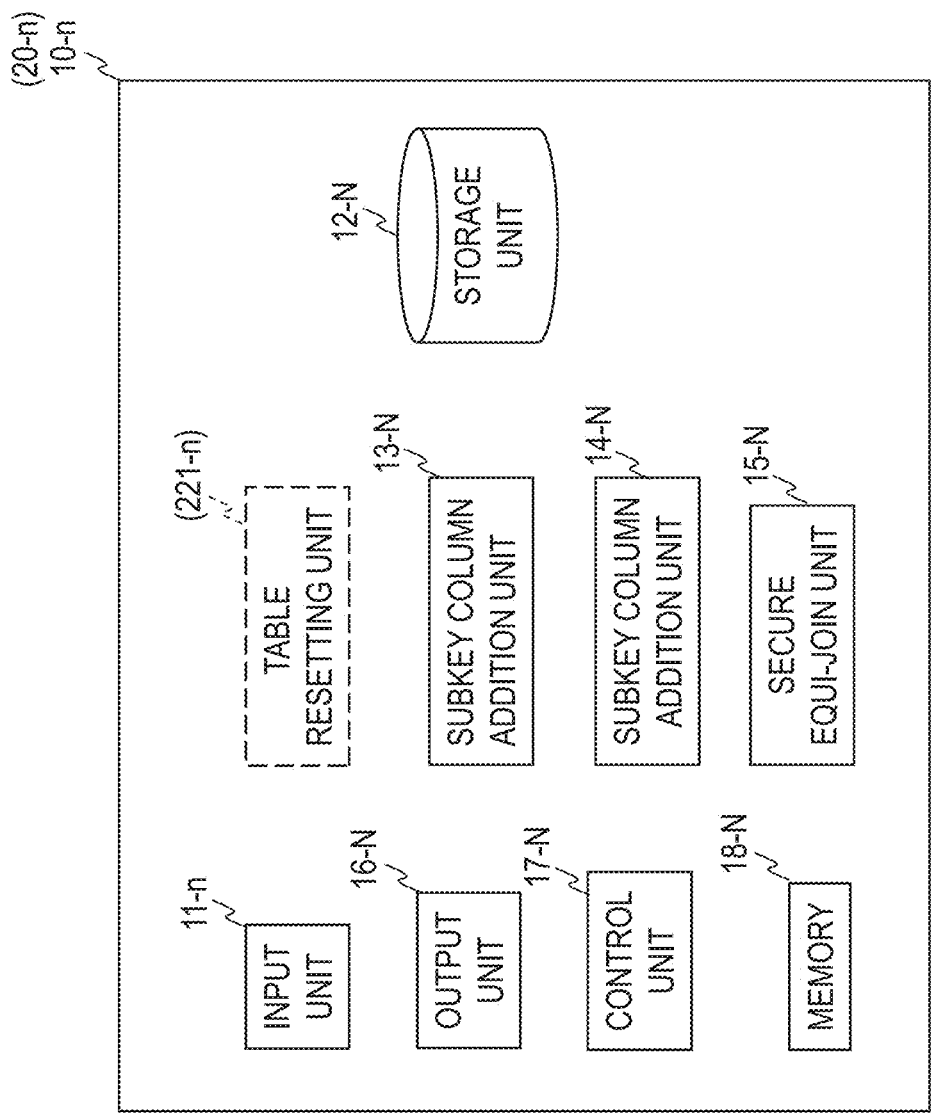
FIG. 2 is a block diagram illustrating a configuration of a secure equi-join device according to the embodiment.

As illustrated in FIG. 2, each secure equi-join device 10-$n$ (where n=0, . . . , N−1) includes an input unit 11-$n$, a storage unit 12-$n$, a subkey column addition unit 13-$n$ (first subkey column addition unit), a subkey column addition unit 14-$n$ (second subkey column addition unit), a secure equi-join unit 15-$n$, an output unit 16-$n$, a control unit 17-$n$, and a memory 18-$n$. Although not described below, each secure equi-join device 10-$n$ executes each processing on the basis of the control unit 17-$n$, stores input data and data obtained in each processing in the memory 18-$n$, and reads and uses the data as necessary.

<Preprocessing>

As preprocessing, the concealed table (first concealed table) [TL] and the concealed table (second concealed table) [TR], which are secure equi-join targets, are input to the input unit 11-$n$ of each secure equi-join device 10-$n$ (FIG. 2) and stored into the storage unit 12-$n$.

FIG. 4A illustrates the concealed table [TL]. The concealed table [TL] is the concealed information of the table TL (first table, left table). The table TL includes a key column TL.Key (first key column) having a plurality of (LRN) keys TL.Key$_0$, . . . , TL.Key$_{LRN-1}$ (first key) and an arbitrary element column TL.V(v) having a plurality of (LRN) arbitrary elements TL.V(v)$_0$, . . . , TL.V(v)$_{LRN-1}$ (first arbitrary element). Here, v=0, . . . , LVN−1, and LVN is a positive integer representing the number of arbitrary element columns. The j-th record TL$_j$ in the table TL includes a key TL.Key$_j$ and LVN arbitrary elements TL.V(0)$_j$, . . . , TL.V(LVN−1) j. The number of records in the table TL is LRN, and in the present embodiment, LRN is an integer of 2 or more.

Specifically, the concealed table [TL] illustrated in the present embodiment includes a concealed key column [TL.Key] having a plurality of (LRN) concealed keys [TL.Key$_0$], . . . , [TL.Key$_{LRN-1}$] and an arbitrary element column [TL.V(v)] having a plurality of (LRN) concealed arbitrary elements [TL.V(v)$_0$], . . . , [TL.V(v)$_{LRN-1}$]. The concealed record [TL;] includes concealed keys [TL.Key$_j$] and LVN concealed arbitrary elements [TL.V(0)$_j$], . . . , [TL.V(LVN−1)$_j$] (FIG. 4A).

The concealed table [TL] of the present embodiment is a table sorted based on the key column TL.Key of the concealed key column [TL.Key]. This sorting may be performed before concealment or may be performed by secure computation after concealment. A sorting method by secure computation is known and is disclosed in Reference Literature 2 and the like, for example.

Reference Literature 2: Dai Igarashi, Koki Hamada, Ryo Kikuchi, Koji Chida, "A Design and an Implementation of Super-High-Speed Multi-Party Sorting: The Day When Multi-Party Computation Reaches Scripting Languages", CSS, 2017.

In addition, the key column TL.Key (first key column) in the table TL contains two or more and KL or less keys (first keys) of the same value. That is, the key column TL.Key contains a plurality of keys with duplicate values, and the maximum value of the number of duplicate values (the maximum value of the number of first keys of the same values contained in the first key column) is KL. KL is an integer of 2 or more. The value of KL is also stored into the storage unit 12-$n$ in association with the concealed table [TL].

FIG. 4B illustrates the concealed table [TR]. The concealed table [TR] is the concealed information of the table TR (second table, right table). The table TR includes a key column TR.Key (second key column) having a plurality of (RRN) keys TR.Key$_0$, . . . , TR.Key$_{RRN-1}$ (second key) and an arbitrary element column TR.V(w) having a plurality of (RRN) arbitrary elements TR.V(w)$_0$, . . . , TR.V(w)$_{RRN-1}$ (second arbitrary element). Here, w=0, . . . , RVN−1, and RVN is a positive integer representing the number of arbitrary element columns. A p-th record TR$_p$ in the table TR includes a key TR.Key$_p$ and RVN arbitrary elements TR.V(0)$_p$, . . . , TR.V(RVN−1)$_p$. The number of records in the table TR is RRN, and in the present embodiment, RRN is an integer of 2 or more.

Specifically, the concealed table [TR] illustrated in the present embodiment includes a concealed key column [TR.Key] having a plurality of (RRN) concealed keys [TR.Key$_0$], . . . , [TR.Key$_{RRN-1}$] and an arbitrary element column [TR.V(w)] having a plurality of (RRN) concealed arbitrary elements [TR.V(w)$_0$], . . . , [TR.V(w)$_{RRN-1}$]. The concealed record [TR$_p$] includes concealed keys [TR.Key$_p$] and RVN concealed arbitrary elements [TR.V(0)$_p$], . . . , [TR.V(RVN−1)$_p$] (FIG. 4B).

The concealed table [TR] of the present embodiment is a table sorted based on the key column TR.Key of the concealed key column [TR.Key]. This sorting may be performed before concealment or may be performed by secure computation after concealment.

In addition, the key column TR.Key (second key column) in the table TR contains two or more and KR or less keys (second keys) of the same value. That is, the key column TR.Key contains a plurality of keys with duplicate values, and the maximum value of the number of duplicate values (the maximum value of the number of second keys of the same value contained in the second key column) is KR. KR is an integer of 2 or more. The value of KR is also stored into the storage unit 12-$n$ in association with the concealed table [TR].

<Processing>

Figure 3:
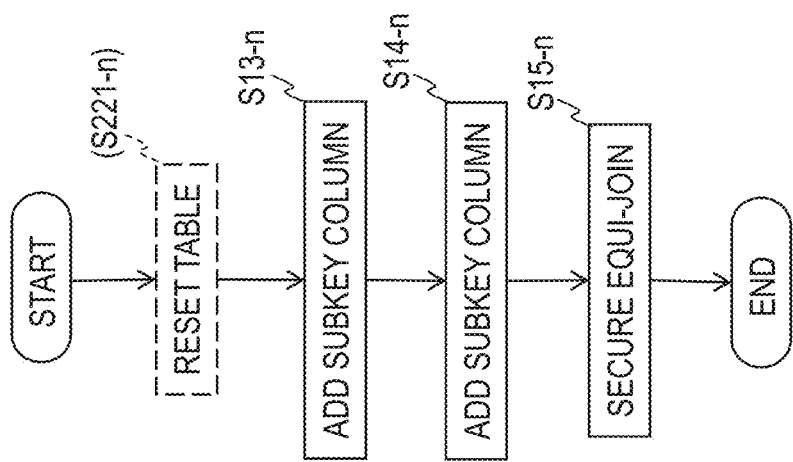
FIG. 3 is a flowchart illustrating a secure equi-join method according to the embodiment.

A secure equi-join method of the present embodiment will be described with reference to FIG. 3.

<<Processing of Subkey Column Addition Unit 13-$n$ (Step S13-$n$)>>

By secure computation using the concealed table (first concealed table) [TL] read from the storage unit 12-$n$, the subkey column addition unit 13-$n$ (first subkey column addition unit) of each secure equi-join device 10-$n$ (FIG. 2) obtains a concealed additional table [TLs] (first concealed additional table) that is concealed information of an additional table TLs (first additional table) which is obtained by adding the subkey column TLs.S (first subkey column) to the table TL (first table), and outputs the obtained concealed additional table [TLs] (FIG. 5A).

As illustrated in FIG. 5A, the key column TLs.Key in the additional table TIs is the key column TL.Key (first key column) in the table TL (FIG. 4A), and the keys $TLs.Key_0, \ldots, TLs.Key_{LRN-1}$ of the key column TLs.Key are $TLs.Key_0=TL.Key_0, \ldots, TLS.Key_{LEN-1}=TL.Key_{LRN-1}$ (first key). The arbitrary element column TLs.V(v) in the additional table TLs is the arbitrary element column TL.V(v) in the table TL (FIG. 4A), and the arbitrary elements $TLS.V(v)_0, \ldots, TLs.V(v)_{LRN-1}$ of the arbitrary element column TLs.V(v) are $TLs.V(v)_0=TL.V(v)_0, \ldots, TLS.V(v)_{LRN-1}=TL.V(v)_{LRN-11}$ (first arbitrary element).

As illustrated in FIG. 5A, the subkey column TLs.S (first subkey column) has a plurality of (LRN) subkeys $TLs.S_0, \ldots, TLS.S_{LRN-1}$ (first subkeys). Each of the keys $TL.Key_0, \ldots, TL.Key_{LRN-1}$ (first key) is associated with any of the subkeys $TLs.S_0, \ldots, TLS.S_{LRN-1}$ (first subkey). In the example of FIG. 5A, the key $TL.Key_j$ is associated with the subkey $TLs.S_j$, and specifically, a concealed key $[TL.Key_j]$ is associated with a concealed subkey $[TLs.S_j]$.

As described above, the key column TL.Key (first key column) contains two or more and KL or less keys (first keys) of the same value. The keys (first keys) of the same value among the keys $TL.Key_0, \ldots, TL.Key_{LRN-1}$ are associated with subkeys $TLs.S_j$ (first subkeys) of different values. In the example of FIG. 5A, the concealed keys having the same restoration value (decryption value) among the concealed keys $[TL.Key_0], \ldots, [TL.Key_{LRN-1}]$ are associated with the concealed subkeys $[TLs.S_j]$ that are the concealed information of the subkeys $TLs.S_j$ of different values.

The relationship between the key $TL.Key_j$ and the subkey $TLs.S_j$ for $j=0, \ldots, LRN-1$ is as follows.

(b-1) $TLs.S_j=0$ when $j=0$
(b-2) $TLs.S_j=0$ when $j>0$ and $TL.Key_j \neq TL.Key_{j-1}$
(b-3) $TLs.S_j=TLs.S_{j-1}+1$ when $j>0$ and $TL.Key_j=TL.Key_{j-1}$ Here, (b-1) means that the first key $TL.Key_0$ is associated with the subkey $TLs.S_0=0$. (b-2) means that when the second and subsequent keys $TL.Key_j$ have values different from those of the immediately preceding key $TL.Key_{j-1}$, the key $TL.Key_j$ is associated with the subkey $TLs.S_j=0$. (b-3) means that when the second and subsequent keys $TL.Key_j$ have the same value as the immediately preceding key $TL.Key_{j-1}$, the key $TL.Key_j$ is associated with the subkey $TLs.S_j=TLs.S_{j-1}+1$. With the concealed table [TL] being a table sorted based on the key column TL.Key of the concealed key column [TL.Key], keys of the same value among the keys $TL.Key_0, \ldots, TL.Key_{LRN-1}$ are associated with subkeys $TLs.S_j$ of different values (values increasing by 1, which are 0, 1, 2, 3 . . . ) by (b-1), (b-2), and (b-3). However, this is an example and does not limit the present invention. In order for the subkey column addition unit 13-n to execute (b-1), (b-2), and (b-3) while keeping each value concealed by secure computation using the concealed table [TL], it is necessary to calculate the concealed [TLs.S] from the concealed [TL.Key]. For this computation, for example, a method used in the secure grouping computation of Reference Literature 3 can be used.

Reference Literature 3: Koki Hamada, Dai Igarashi, Koji Chida, "An Algorithm for Computing Aggregate Median on Secure Function Evaluation", In CSS, 2012.

The secure grouping operation is a method of obtaining a median or the like for each group by grouping by values in a column [Key] while keeping a table [T] concealed. Reference Literature 3 describes a method of assigning concealed values of increment values starting from 0 to concealed values $[Key_j]$ of $Key_j$ of the same value included in the table [T] subjected to secure sorting based on the Key column (computation of step+). When a function for performing this operation is expressed as groupby, the subkey column addition unit 13-n can obtain [TLs.S] from [TL.Key] as follows.

Function Groupby:
[TLs.S]=groupby ([TL.Key])
Input: [TL.Key]
Output: [TLs.S]

<<Processing of Subkey Column Addition Unit 14-n (Step S14-n)>>

By secure computation using the concealed table (second concealed table) [TR] read from the storage unit 12-n, the subkey column addition unit 14-n (second subkey column addition unit) of each secure equi-join device 10-n obtains a concealed additional table [TRs] (second concealed additional table) that is concealed information of an additional table TRs (second additional table) which is obtained by adding the subkey column TRs.S (second subkey column) to the table TRc (third table), and outputs the obtained concealed additional table [TRs] (FIGS. 5B and 6).

The table TRc (third table) is a table which is obtained by adding a plurality of copied records, obtained by copying each record $TR_p$ (where $p=0, \ldots, RRN-1$) in the table TR (second table) (FIG. 4B) K times, to the table TR (second table) (FIG. 5B). Here, $K \geq KL$, preferably K=KL. In the present embodiment, the value of KL is read from the storage unit 12-n and used. As described above, each record $TR_p$ in the table TR (second table) includes the key $TR.Key_p$ (second key) and the arbitrary elements $TR.V(0)_p, \ldots, TR.V(RVN-1)_p$ (second arbitrary element). For example, [TRc] illustrated in FIG. 5B is a table which is obtained by adding a plurality of concealed copied records, obtained by copying each $[TR_p]$ (where $p=0, \ldots, RRN-1$) of [TR] K times, to [TR]. For example, each $[TR_p]$ of [TR] includes $[TR.Key_p], [TR.V(0)_p], \ldots, [TR.V(RVN-1)_p]$.

As illustrated in FIG. 5B, a key column TRc.Key (third key column) in the table TRc (third table) contains RRN*K keys of $TRc.Key_0=TR.Key_0, \ldots, TRc.Key_{K-1}=TR.Key_0$, $TRc.Key_K=TR.Key_1, \ldots, TRc.Key_{2K-1}=TR.Key_1, \ldots$, $TRc.Key_{RRN*K-1}=TR.Key_{LRN-1}$ (a plurality of third keys including the second keys and the copies of the second keys). An arbitrary column TRc.V(v) (third arbitrary element column) in the table TRc contains $TRc.V(v)_0=TR.V(v)_0, \ldots, TRc.V(v)_{K-1}=TR.V(v)_0, TRc.V(v)_K=TR.V(v)_1, \ldots, TRc.V(v)_{2K-1}=TR.V(v)_1, \ldots, TRc.V(v)_{RRN*K-1}=TR.V(v)_{RRN-1}$ (a plurality of third arbitrary elements including the second arbitrary elements and the copies of the second arbitrary elements).

As illustrated in FIG. 6, a key column TRs.Key in the additional table TRs is the key column TRc.Key (third key column) in the table TRc (FIG. 5B) and contains RRN*K keys of $TRs.Key_0=TR.Key_0, \ldots, TRs.Key_{K-1}=TR.Key_0$, $TRs.Key_K=TR.Key_1, \ldots, TRs.Key_{2K-1}=TR.Key_1, \ldots$, $TRS.Key_{RRN*K-1}=TR.Key_{RRN-1}$ (a plurality of third keys including the second key and the copies of the second key). An arbitrary column TRs.V(v) in the additional table TRs is the arbitrary column TRc. V(v) (third arbitrary element column) in the table TRc (FIG. 5B) and contains $TRs.V(v)_0=TR.V(v)_0, \ldots, TRs.V(v)_{K-1}=TR.V(v)_0, TRs.V(v)_K=TR.V(v)_1, \ldots, TRs.V(v)_{2K-1}=TR.V(v)_1, \ldots, TRs.V(v)_{RRN*K-1}=TR.V(v)_{RRN-1}$ (a plurality of third arbitrary elements including the second arbitrary elements and the copies of the second arbitrary elements).

The subkey column TRs.S (second subkey column) in the additional table TRs (second additional table) has a plurality of (RRN*K) subkeys TRs.S$_0$, ..., TRs.SRR$_{N*K-1}$ (second subkeys). Each of the keys TRs.Key$_0$=TR.Key$_0$, TRs.Key$_{K-1}$=TR.Key$_0$, TRs.Key=TR.Key$_1$, TRs.Key$_{2K-1}$=TR.Key$_1$, ..., TRs.Key$_{RRN*K-1}$=TR.Key$_{RRN-1}$ (third key) in the additional table TRs is associated with any of the subkeys TRs.S$_0$, ..., TRs.SRR$_{N*K-1}$ (second subkey). In the present embodiment, the key TRs.Key$_1$ is associated with the subkey TRs.S$_1$ (where i=0, ..., RRN*K-1). For example, keys of the same values among the keys TRs.Key$_0$, ..., TRs.Key$_{RRN*K-1}$ are associated with subkeys TRs.S$_i$ of different values. In the example of FIG. 6, the concealed keys having the same restoration value (decryption value) among the concealed keys [TRs.Key$_0$], ..., [TRs.Key$_{RRN*K-1}$] are associated with the concealed subkeys [TRs.S$_i$] that are the concealed information of the subkeys TRs.S$_i$ of different values.

For example, when the key column TRs.Key (third key column, TRc.Key) (FIG. 6) in the additional table TRs (second additional table) contains TRs.Key$_i$ (third key, TR.Key$_i$) representing the same value (common value) as any key TLs.Key$_j$(first key, TL.Key$_j$) in the additional table TLS (FIG. 5A), at least some of TRs.Key$_i$ (third keys, TR.Key$_i$) representing the common value are associated with the subkeys TRs.S$_i$ (second subkeys) of the same value as the subkeys TLs.S$_j$(first subkeys) associated with the keys TLs.Key$_j$(first keys, TL.Key$_j$) representing the common value. For example, at least some of [TRs.Key$_i$] being the concealed information of TRs.Key$_i$ (third keys, TR.Key$_i$) representing the common value are associated with [TRs.S$_i$] being the concealed information of the subkeys TRs.S$_i$ (second subkeys) of the same value as the subkeys TLs.S$_j$ (first subkey) associated with the keys TLs.Key$_j$ (first keys, TL.Key$_j$) representing the common value. Preferably, when the key column TRs.Key (third key column, TRc.Key) in the additional table TRs (second additional table) (FIG. 6) contains TRs.Key$_i$ (third key, TR.Key$_i$) representing the common value, the value of any subkey TLs.S$_j$(first subkey) associated with the key TLs.Key$_j$ (first key, TL.Key$_j$) (FIG. 5A) representing the common value is the same value as any of the subkeys TRS.So, ..., TRs.S$_{RRN*K-1}$ (second subkey) associated with TRs.Key$_j$ (third key, TR.Key$_i$) representing the common value. For example, the value of the subkey TLs.S$_j$(first subkey) that is the restoration value (decryption value) of any concealed subkey [TLs.S$_j$] associated with [TLs.Key$_j$] (FIG. 5A) that is the concealed information of the key TLs.Key$_j$(first key, TL.Key$_j$) representing the common value is the same value as any of the subkeys TRs.S$_0$, ..., TRs.SRR$_{N*K-1}$ (second subkey) that is the restoration value (decryption value) of the concealed subkeys [TRs.S$_0$] ..., [TRs.SRR$_{N*K-1}$] associated with [TRs.Key$_i$] that is the concealed information of TRs.Key$_i$ (third key, TR.Key$_i$) representing the common value.

A relationship among [TR], [TRc], and [TRs] will be exemplified below.

It is assumed that, for i=0, ..., RRN·K-1, a quotient obtained by dividing i by K is idk (i.e., idk=i div K), and that imk=i-idk*K. An idk-th record in the table TR (second table) (FIG. 4B) is TR$_{idk}$, an i-th record in the table TRc (third table) (FIG. 5B) is TR$_{ci}$, and an i-th subkey (second subkey) of the subkey column TRs.S (second subkey column) in the additional table TRs (second additional table) (FIG. 6) is TRs.S$_i$. In this case, TR$_{si}$=TR$_{ci}$=TR$_{idk}$, and TRs.S$_i$=imk.

Thus, the subkey column addition unit 14-n can obtain the concealed additional table [TRs] from the concealed table [TR] as follows.

For i=0, ..., RRN·K-1, the following processing is performed, where a quotient obtained by dividing i by K is idk, and imk=i-idk*K.

(c-1) [TR$_{ai}$]=[TR$_{ci}$]=[TR$_{idk}$]

(c-2) [TRs.S$_i$]=[imk]

Here, (c-1) can be realized by copying the concealed record [TR$_{idk}$] in the concealed table [TR] as [TR$_{si}$]. (c-2) can be realized by concealing (e.g., performing secret sharing on) imk to set [TRs.S$_i$]=[imk]

Although the table TRc and the concealed table [TRc] are shown here for description, the subkey column addition unit 14-n only needs to obtain the concealed additional table [TRs] (FIG. 6) by secure computation using the concealed table [TR] (FIG. 4B) and does not necessarily need to obtain the concealed table [TRc] (FIG. 5B) with the table TRc concealed. That is, the subkey column addition unit 14-n may directly obtain [TRs] from [TR], or may obtain [TRc] from [TR] and further obtain [TRs] from [TRc].

<<Processing of Secret Equi-Join Unit 15-n (Step S15-n)>>

By secure computation using the concealed additional table [TLs] (first concealed additional table) (FIG. 5A) and the concealed additional table [TRs] (second concealed additional table) (FIG. 6) obtained as described above, the secure equi-join unit 15-n of the secure equi-join device 10-n obtains a concealed joined table [ETRL] that is concealed information of a joined table ETRL which is obtained by equi-joining the additional table TLs (first additional table) and the additional table TRs (second additional table), using the pair (TLs.Key$_j$, TLs.S$_j$) (j=0, ..., LRN-1) of the TLs.Key$_j$ (first key) and the subkey TLs.S$_j$(first subkey) in the table TLs as the key attribute in the additional table TLs (first additional table) and the pair (TRs.Key$_i$, TRs.S$_i$) (i=0, ..., RRN*K-1) of the key TRs.Key$_i$ (third key) and the subkey TRs.S$_i$ (second subkey) in the additional table TRs as the key attribute in the additional table TRs (second additional table), and outputs the obtained concealed joined table [ETRL]. As described above, the joined table TLR is a table obtained by extracting only records satisfying the equal sign (TLs.Key$_j$, TLs.S$_j$)=(TRs.Key$_i$, TRs.S$_i$) from the table TRL being the cross-join result of the additional table TLs and the additional table TRs.

Here, keys of the same value among the keys TLs.Key$_0$=TL.Key$_0$, ..., TLS.Key$_{LRN-1}$=TL.Key$_{LRN-1}$ in the additional table TLs (first additional table) are associated with subkeys TLs.S$_j$ of different values. Thus, the values of the pair (TLs.Key$_j$, TLs.S$_j$) being the key attribute in the additional table TLs uniquely specify each record TLs$_j$. In other words, there are no pairs of the same values (pairs where both elements are duplicate) among the pairs (TLs.Key$_0$, TLs.S$_0$), ..., (TLS.Key$_{LRN-1}$, TLS.S$_{LRN-1}$) in the additional table TLs. On the other hand, the values of the pair (TRs.Key$_i$, TRs.S$_i$) being the key attribute in the additional table TRs (second additional table) do not uniquely specify each record TRs$_j$. In other words, there are pairs of the same values (pairs where both elements are duplicate) among the pairs (TRs.Key$_0$, ..., TRs.S$_0$), ..., (TRs.Key$_{RRN*K-1}$, TRs.SRR$_{N*K-1}$) in the additional table TRs. Patent Literature 1 discloses a method of performing an equi-join by secure computation in a case where there are no duplicate key attributes in one of two tables to be equi-joined and there are duplicate key attributes in the other table as described above. Therefore, the secure equi-join unit 15-n obtains the concealed joined table [ETRL] by secure computation using the concealed additional table [TLs] and the concealed additional table [TRs] in accordance with the method disclosed in Patent Literature 1, for example, and outputs the obtained concealed joined table [ETRL]. This processing is described as follows.

Function Join:
  [ETRL]=join (([TLs.Key], [TLs.S], [TLs.V(0)], . . . , [TLs.V(LVN−1)]),
  ([TRs.Key], [TRs.S], [TRs.V(0)], . . . , [TRs.V(RVN−1)]),
  ([TLs.Key], [TLs.S]),
  ([TRs.Key], [TRs.S]))
  Input: ([TLs.Key], [TLs.S], [TLs.V(0)], . . . , [TLs.V(LVN−1)]), ([TRs.Key], [TRs.S], [TRs.V(0)], . . . , [TRs.V (RVN−1)])
  Output: [ETRL]=([TLs.Key], [TLs.S], [TLs.V (0)], . . . , [TLs.V(LVN−1)], [TRs.Key], [TRs.S], [TRs. V (0)], . . . , [TRs.V(RVN−1)])

Here, join is a function of a secure equi-join as follows.
  [table obtained by equi-joining tables 1 and 2]=join ([table 1], [table 2], [key attribute of table 1], [key attribute of table 2])

The obtained concealed joined table [ETRL] may be used for other processing (e.g., secure equality processing and restoration processing) in the secret equi-join device $10\text{-}n$ or may be output from the output unit $16\text{-}n$ and used for processing in other devices.

<Example>

Next, the present embodiment will be described using a specific example.

This specific example illustrates an example in which concealed tables illustrated in FIGS. 7A to 7C are subjected to the secret equi-join to obtain a concealed joined table illustrated in FIG. 7D. The concealed table in FIG. 7A is concealed information of a beverage product name table with "ID" as a key column and "beverage product name" as an arbitrary element column (hereinafter, a "concealed beverage product name table"). The key column in the beverage product name table has IDs="1000", "4050", and "3210" as elements, and the arbitrary element column has beverage product names="Mineral water A", "Black coffee B", and "Orange juice C" as elements. The concealed table in FIG. 7B is concealed information of a capacity table with "ID" as a key column and "capacity" as an arbitrary element column (hereinafter, a "concealed capacity table"). The key column in the capacity table has IDs="1000", "1000", "1000", "4050", and "3210" as elements, and the arbitrary element column has capacities="200", "500", "1000", "200", and "500" as elements. The concealed table in FIG. 7C is concealed information of a container type table with an ID as a key column and "container" as an arbitrary element column (hereinafter, a "concealed container type table"). The key column in the container type table has IDs="1000", "1000", "4050", "4050", and "3210" as elements, and the arbitrary element column has containers="PET bottle", "aluminum can", "PET bottle", "aluminum can", and "aluminum can" as elements.

Figure 8:
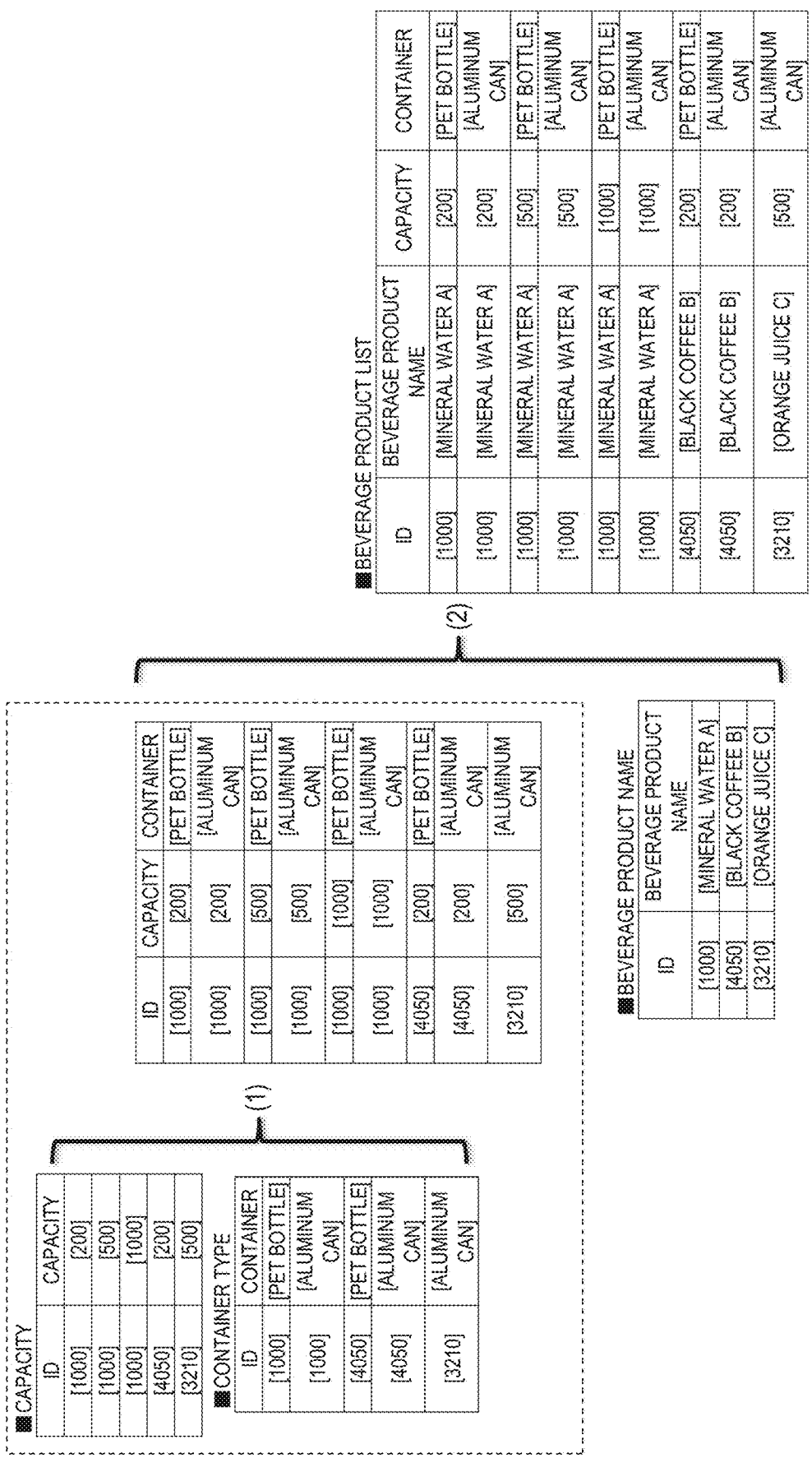
FIG. 8 is a diagram for illustrating equi-join.

Here, the key column corresponding to the concealed beverage product name table in FIG. 7A does not have elements (keys) of the same value. On the other hand, the key column corresponding to the concealed capacity table in FIG. 7B has elements "1000" being the same value, and the key column corresponding to the concealed container type table in FIG. 7C has elements "1000" and "4050" being the same values. Therefore, as illustrated in FIG. 8, (1) using the method of the present embodiment, first, a secret equi-join between the concealed capacity table in FIG. 7B and the concealed container type table in FIG. 7C is performed to obtain a concealed joined table, and then, (2) a secret equi-join between the concealed joined table and the concealed beverage product name table in FIG. 7A is performed to obtain a final concealed joined table illustrated in FIG. 7D. Here, the concealed capacity table is set to [TL], and LRN=5, LVN=1, [TL.Key]=[ID], [TL.Key$_0$]=[1000], [TL.Key$_1$]=[1000], [TL.Key$_2$]=[1000], [TL.Key$_3$]=[4050], [TL.Key$_4$]=[3210], [TL.V(0)$_0$]=[200], [TL.V(0)$_1$]=[500], [TL.V(0)$_2$]=[1000], [TL.V(0)$_0$]=[200], and [TL.V(0)$_4$]=[500] are set. Further, the concealed container type table is set to [TR], and RRN=5, RVN=1, [TR.Key]=[ID], [TR.Key$_0$]=[1000], [TR.Key$_1$]=[1000], [TR.Key$_2$]=[4050], [TR.Key$_1$]=[4050], [TR.Key$_4$]=[3210], [TR.V(0)$_0$]=[PET bottle], [TR.V(0)$_1$]=[aluminum can], [TR.V(0)$_2$]=[PET bottle], [TR.V(0)$_3$]=[aluminum can], and [TR.V(0)$_4$]=[aluminum can] are set.

When the processing of step S13-$n$ is executed on the concealed capacity table [TL], for example, a concealed additional table (concealed "capacity+sequence number" table) [TLs] illustrated in FIG. 9A is obtained. In the concealed additional table [TLs], LRN=5, LVN=1, [TLs.Key]=[ID], [TLs.Key$_0$]=[1000], [TLs.Key$_1$]=[1000], [TLs.Key$_2$]=[1000], [TLs.Key$_3$]=[4050], [TLs.Key$_4$]=[3210][TLs.S]=[SeqNo], [TLs.S$_0$]=[0], [[TLs.S$_1$]=[1], [[TLs.S$_2$]=[2], [[TLs.S$_3$]=[0], [TLs.S$_4$]=[0], [TLs.V(0)$_0$]=[200], [TLs.V(0)$_1$]=[500], [TLs.V(0)$_2$]=, [TLs.V(0)$_3$]=[200], and [TLs.V(0)$_4$]=.

When the processing of step S14-$n$ is executed on the concealed container type table [TR], for example, a concealed additional table (concealed "capacity type+sequence number" table) [TRs] illustrated in FIG. 9B is obtained. In the concealed additional table [TRs], K=5, RRN=5, RVN=1, [TRs.Key]=[ID], [TRs.Key$_0$]=[1000], [TRs.Key$_1$]=[1000], [TRs.Key$_2$]=[1000], [TRs.Key$_3$]=, [TRs.Key$_4$]=[1000], [TRs.Key$_4$]=[1000], [TRs.Key$_0$]=[4050], [TRs.Key$_7$]=[4050], [TRs.Key$_8$]=[4050], [TRs.Key$_9$]=[4050], [TRs.Key$_{10}$]=[4050], [TRs.Key$_{11}$]=, [TRs.Key$_{12}$]=[3210], [TRs.Key$_{13}$]=[3210], [TRs.Key$_{14}$]=[3210], [TRs.S]=[SeqNo], [TRs.S$_0$]=[0], [TRs.S$_1$]=[1], [TRs.S$_2$]=[2], [TRs.S$_3$]=[0], [TRs.S$_4$]=[1], [TRs.S$_5$]=[2], [TRs.S$_6$]=[0], [TRs.S$_7$]=[1], [TRs.S$_8$]=[2], [TRs.S$_9$]=[0], [TRs.S$_{10}$]=[1], [TRs.S$_{11}$]=[2], [TRs.S$_{12}$]=[0], [TRs.S$_{13}$]=[1], [TRs.S$_{14}$]=[2], [TRs.V(0)$_0$]=[PET bottle], [TRs.V(0)$_1$]=[PET bottle], [TRs.V(0)$_2$]=[PET bottle], [TRs.V(0)$_3$]=[aluminum can], [TRs.V(0)$_4$]=[aluminum can], [TRs.V(0)$_5$]=[aluminum can], [TRs.V(0)$_6$]=[PET bottle], [TRs.V(0)$_7$]=[PET bottle], [TRs.V(0)$_8$]=[PET bottle], [TRs.V(0)$_8$]=[aluminum can], [TRs.V(0)$_9$]=[aluminum can], [TRs.V(0)$_{10}$]=[aluminum can], [TRs.V(0)$_{11}$]=[aluminum can], [TRs.V(0)$_{12}$]=[aluminum can], [TRs.V(0)$_{13}$]=[aluminum can], and [TRs.V(0)$_{14}$]=[aluminum can]

When the processing of step S15-$n$ is executed on the concealed additional table [TLs] and the concealed additional table [TRs], for example, the concealed joined table [ETRL]=([TLs.Key], [TLs.S], [TLs.V(0)], . . . , [TLs.V (LVN−1)], [TRs.Key], [TRs.S], [TRs.V(0)], . . . , [TRs.V (RVN−1)])=([ID], [SeqNo], [volume], [ID], [SeqNo], [container]) illustrated in FIG. 10 is obtained.

Features of Present Embodiment

As described above, in the present embodiment, by secure computation using the concealed table (first concealed table) [TL], the subkey column addition unit $13\text{-}n$ obtains the concealed additional table [TLs] (first concealed additional table) that is the concealed information of the additional table TLs (first additional table) which is obtained by adding the subkey column TLs.S (first subkey column) to the table TL (first table) (step S13-$n$). Further, by secure computation using the concealed table (second concealed table) [TR], the subkey column addition unit 14-$n$ obtains the concealed additional table [TRs] (second concealed additional table) that is the concealed information of the additional table TRs (second additional table) which is obtained by adding the subkey column TRs.S (second subkey column) to the table TRc (third table) obtained by copying the record of TR (step S14-$n$). Then, by secure computation using the concealed additional table [TLs] (first concealed additional table) and the concealed additional table [TRs] (second concealed additional table), the secret equi-join unit 15-$n$ obtains a concealed joined table [ETRL] that is concealed information of a joined table ETRL obtained by equi-joining the additional table TLs (first additional table) and the additional table TRs (second additional table), using the pair (TLs.Key$_j$, TLs.S$_j$) ($j=0, \ldots, $ LRN$-1$) of the TLs.Key$_j$ (first key) and the subkey TLs.S$_j$ (first subkey) in the table TLs as the key attribute in the additional table TLS (first additional table) and the pair (TRs.Key$_i$, TRs.S$_i$) ($i=0, \ldots, $ RRN*K$-1$) of the key TRs.Key (third key) and the subkey TRs.S$_i$ (second subkey) in the additional table TRs as the key attribute in the additional table TRs (second additional table), and outputs the obtained concealed joined table [ETRL] (step S15-$n$). Here, keys of the same value among the keys TLs.Key$_0$=TL.Key$_0$, $\ldots$, TLS.Key$_{LRN-1}$=TL.Key$_{LRN-1}$ in the additional table TLs (first additional table) are associated with subkeys TLs.S$_j$ of different values. Therefore, there are no pairs of the same values (pairs where both elements are duplicate) among the pairs (TLs.Key$_0$, TLs.S$_0$), $\ldots$, (TLS.Key$_{LRN-1}$, TLS.S$_{LRN-1}$) being the key attributes in the additional table TLs. The secret equi-join unit 15-$n$ can obtain the concealed joined table [ETRL] by secure computation using the concealed additional table [TLs] and the concealed additional table [TRs] in accordance with the method disclosed in Patent Literature 1, for example. In this case, it is not necessary to perform processing such as the division of the tables before the secret equi-join and the join of the tables after the secret equi-join, and it is thus possible to equi-join the two tables at high speed while keeping the information of the tables concealed.

In particular, the table TRc (third table) (FIG. 5B) is a table which is obtained by adding a plurality of copied records, obtained by copying each record TR$_p$ (where $p=0, \ldots, $ RRN$-1$) in the table TR (second table) (FIG. 4B) K times, to the table TR (second table), and the processing can be performed at the highest speed when K=KL.

Furthermore, when the maximum value KR of the number of keys (second keys) of the same value contained in the key column TR.Key (second key column) in the table TR (second table, right table) is equal to or less than the maximum value KL of the number of keys of the same value contained in the key column TL.Key (first key column) in the table TL (first table, left table) (KR≤KL), the processing can be performed at a higher speed. Therefore, the concealed table (first concealed table) [TL] and the concealed table (second concealed table) [TR] are preferably stored in the storage unit 12-$n$ so as to satisfy KR≤KL.

In the present embodiment, the values of KL and KR have been stored in the storage unit 12-$n$, but when at least one of the values is known, the known value may not be stored in the storage unit 12-$n$.

Second Embodiment

As described above, the concealed table (first concealed table) [TL] and the concealed table (second concealed table) [TR] are stored in the storage unit 12-$n$ so that KR≤KL, whereby the processing can be performed at a higher speed. In an environment where this is not guaranteed, the processing of swapping the concealed tables to satisfy KR≤KL may be performed. Hereinafter, differences from the first embodiment will be mainly described, and the same reference numerals will be applied to the already described matters to simplify the description.

<Configuration>

As illustrated in FIG. 1, a secret equi-join system 2 of the present embodiment includes N pieces of secret equi-join devices 20-0, $\ldots$, 20-(N$-1$). The secret equi-join devices 20-0, $\ldots$, 20-(N$-1$) of the present embodiment are communicably connected via a network.

As illustrated in FIG. 2, each of the secret equi-join devices 20-$n$ (where $n=0, \ldots, $ N$-1$) includes a table resetting unit 221-$n$, an input unit 11-$n$, a storage unit 12-$n$, a subkey column addition unit 13-$n$ (first subkey column addition unit), a subkey column addition unit 14-$n$ (second subkey column addition unit), a secret equi-join unit 15-$n$, an output unit 16-$n$, a control unit 17-$n$, and a memory 18-$n$. Although not described below, each secret equi-join device 20-$n$ executes each processing on the basis of the control unit 17-$n$, stores input data and data obtained in each processing in the memory 18-$n$, and reads and uses the data as necessary.

<Preprocessing>

This is the same as the first embodiment.

<Processing>

A secret equi-join method of the present embodiment will be described with reference to FIG. 3.

<<Processing of Table Resetting Unit 221-$n$ (Step S221-$n$)>>

The table resetting unit 221-$n$ reads the values of KR (the maximum value of the number of the second keys of the same value contained in the second key column) and KL (the maximum value of the number of the first keys of the same value contained in the first key column) from the storage unit 12-$n$. When KR is larger than KL, the table resetting unit 221-$n$ swaps the concealed table [TL] (first concealed table) with the concealed table [TR] (second concealed table) stored into the storage unit 12-$n$ and stores the tables in the storage unit 12-$n$. Accordingly, the table TL (first table, left table) including the key column TL.Key (first key column) having the plurality of (LRN) keys TL.Key$_0$, $\ldots$, TL.Key$_{LRN-1}$ (first key) and an arbitrary element column TL.V(v) having the plurality of (LRN) arbitrary elements TL.V(v)$_0$, $\ldots$, TL.V(v)$_{LRN-1}$ (first arbitrary element), and the table TR (second table, right table) including the key column TR.Key (second key column) having the plurality of (RRN) keys TR.Key$_0$, $\ldots$, TR.Key$_{RRN-1}$ (second key) and an arbitrary element column TR.V(w) having the plurality of (RRN) arbitrary elements TR.V(w) $\ldots$, TR.V(w)$_{RRN-1}$ (second arbitrary element) are reset respectively as the table TR (second table, right table) including the key column TR.Key (second key column) having the plurality of (RRN) keys TR.Key$_0$, $\ldots$, TR.Key$_{RRN-1}$ (second key) and an arbitrary sequence TR.V(w) having the plurality of (RRN) arbitrary elements TR.V(w)$_0$, $\ldots$, TR.V(w)$_{RRN-1}$ (second arbitrary element), and the table TL (first table, left table) including the key column TL.Key (first key column) having the plurality of (LRN) keys TL.Key$_0$, $\ldots$, TL.Key$_{LRN-1}$ (first key) and an arbitrary element column TL.V(v) having the plurality of (LRN) arbitrary elements TL.V(v)$_0$, $\ldots$, TL.V(v)$_{LRN-1}$ (first arbitrary element). The concealed table [TL] (first concealed table) and the concealed table [TR] (second concealed table) reset as described above satisfy the relationship of KR≤KL. On the other hand, when KR and KL satisfy the relationship of KR≤KL, the table resetting unit 221-$n$ does not swap the concealed tables [TL] and [TR].

After step S221-$n$, the processing of each of steps S13-$n$, S14-$n$, and S15-$n$ described in the first embodiment is executed.

Features of Present Embodiment

An effect similar to that of the first embodiment can be obtained in the present embodiment. Moreover, even when [TL] and [TR] satisfying the relationship of KR≤KL are not stored in the storage unit 12-$n$, [TL] and [TR] can be swapped to satisfy the relationship of KR≤KL. It is thereby possible to perform the secret equi-join at a higher speed.
[Hardware Configuration]

The secret equi-join device 10-$n$, 20-$n$ in the respective embodiments are devices configured by a general-purpose or dedicated computer including, for example, a processor (hardware processor) such as a central processing unit (CPU) or a memory such as a random-access memory (RAM) or a read-only memory (ROM) executing a predetermined program. That is, the secret equi-join device 10-$n$, 20-$n$ in the respective embodiments each have, for example, processing circuitry configured to implement each unit included therein. The computer may include one processor and one memory or may include a plurality of processors and a plurality of memories. The program may be installed in the computer or may be recorded in a ROM or the like in advance. Also, some or all of the processing units may be formed with an electronic circuit that independently implements the processing functions, rather than an electronic circuit (circuitry) that forms the functional components by reading the program like a CPU. Also, an electronic circuit forming one device may include a plurality of CPUs.

Figure 11:
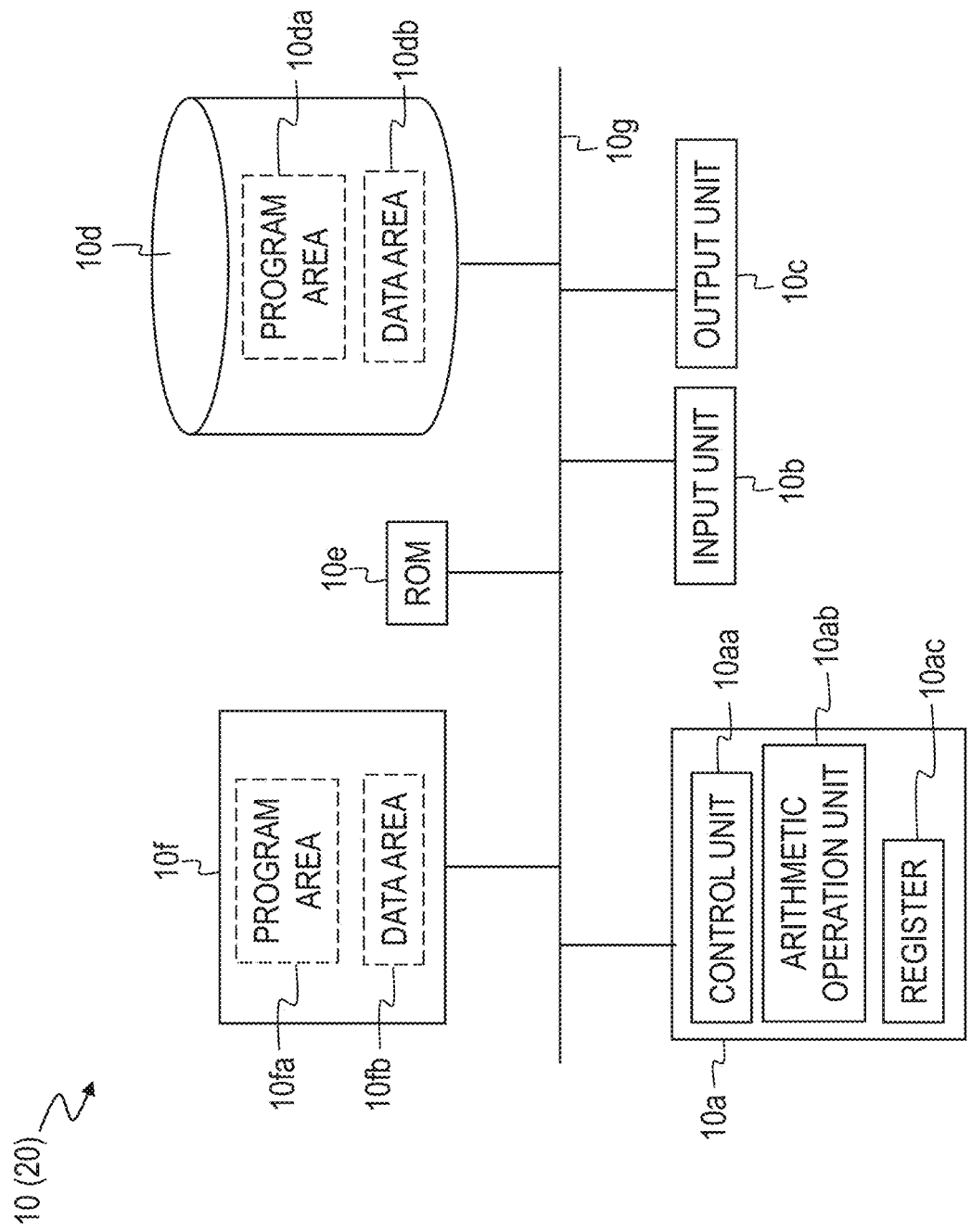
FIG. 11 is a block diagram illustrating a hardware configuration of a secure equi-join device according to the embodiment.

FIG. 11 is a block diagram illustrating a hardware configuration of each of the secret equi-join device 10-$n$, 20-$n$ in the respective embodiments. As illustrated in FIG. 11, each of the secret equi-join device 10-$n$, 20-$n$ of this example includes a central processing unit (CPU) 10$a$, an input unit 10$b$, an output unit 10$c$, a random-access memory (RAM) 10$d$, a read-only memory (ROM) 10$e$, an auxiliary storage device 10$f$, and a bus 10$g$. The CPU 10$a$ in this example includes a control unit 10$aa$, an arithmetic operation unit 10$ab$, and a register 10$ac$, and performs various arithmetic operations in accordance with various programs read into the register 10$ac$. The input unit 10$b$ is an input terminal to which data is input, a keyboard, a mouse, a touch panel, or the like. The output unit 10$c$ is an output terminal from which data is output, a display, a local area network (LAN) card or the like controlled by the CPU 10$a$ that has read a predetermined program. The RAM 10$d$ is a static random-access memory (SRAM), a dynamic random-access memory (DRAM), or the like, and incudes a program area 10$da$ in which a predetermined program is stored and a data area 10$db$ in which various kinds of data are stored. The auxiliary storage device 10$f$ is a hard disk, a magneto-optical disc (MO), a semiconductor memory, or the like, for example, and includes a program area 10$fa$ in which a predetermined program is stored and a data area 10$fb$ in which various kinds of data are stored. The bus 10$g$ connects the CPU 10$a$, the input unit 10$b$, the output unit 10$c$, the RAM 10$d$, the ROM 10$e$, and the auxiliary storage device 10$f$ so that information can be exchanged among these components. The CPU 10$a$ writes, into the program area 10$da$ of the RAM 10$d$, the program stored in the program area 10$fa$ of the auxiliary storage device 10$f$ in accordance with a read operating system (OS) program. Similarly, the CPU 10$a$ writes, into the data area 10$db$ of the RAM 10$d$, the various kinds of data stored in the data area 10$fb$ of the auxiliary storage device 10$f$. Addresses in the RAM 10$d$ at which the program and the data have been written are stored into the register 10$ac$ of the CPU 10$a$. The control unit 10$aa$ of the CPU 10$a$ sequentially reads these addresses stored in the register 10$ac$, reads the program and the data from the areas in the RAM 10$d$ indicated by the read addresses, causes the arithmetic operation unit 10$ab$ to sequentially execute arithmetic operations indicated by the program, and stores results of the arithmetic operations into the register 10$ac$. With such a configuration, the functional configurations of the secret equi-join device 10-$n$, 20-$n$ are realized.

The program described above can be recorded in a computer-readable recording medium. Examples of the computer-readable recording medium include a non-transitory recording medium. Examples of such a recording medium include a magnetic recording device, an optical disc, a magneto-optical recording medium, a semiconductor memory, and the like.

The program is distributed by selling, giving, or renting portable recording media such as DVDs or CD-ROMs recording the program thereon, for example. Furthermore, a configuration in which the program is stored in a storage device in a server computer and the program is distributed by transferring the program from the server computer to other computers via a network may also be employed. As described above, the computer executing such a program first stores the program recorded in the portable recording medium or the program transferred from the server computer temporarily into a storage device of the computer, for example. The computer then reads the program stored in the storage device itself and performs processing in accordance with the read program at the time of execution of the process. Also, in other performance modes of the program, the computer may read the program directly from the portable recording medium and performs processing in accordance with the program, or alternatively, the computer may sequentially perform processing in accordance with the received program every time the program is transferred from the server computer to the computer. The processing described above may be performed by a so-called application service provider (ASP) service that implements a processing function only by issuing an instruction to perform the program and acquiring the result, without transferring the program from the server computer to the computer. Note that the program in this mode includes information that is to be used in processing by an electronic computer and is equivalent to the program (data and the like that are not direct commands to the computer but have properties that define the processing to be performed by the computer).

Although this device is formed with a computer executing a predetermined program in each embodiment, at least some of the processing contents may be realized by hardware.

Note that the present invention is not limited to the embodiments described above. For example, the secret equi-join devices 10-0, . . . , 10-(N−1) (or 20-0, . . . , 20-(N−1)) may transfer data via a portable recording medium instead of the network. In the embodiments described above, the sequence numbers such as values incremented by 1, which are 0, 1, 2, 3 . . . , have been exemplified as the subkeys, but other numbers or symbols may be used as the subkey.

Also, the various kinds of processing described above may be executed not only in a chronological manner in accordance with the description but also in parallel or individually in accordance with the processing ability of the devices that execute the processing or as necessary. It is needless to say that appropriate modifications can be made without departing from the gist of the present invention.

REFERRNCE SIGNS LIST 1, 2 secret equi-join system
10-$n$, 20-$n$ secret equi-join device
13-$n$, 14-$n$ subkey addition unit
15-$n$ secret equi-join unit
221-$n$ table resetting unit

The invention claimed is:

1. A secret equi-join device comprising:
(a) a storage;
(b) a first subkey column addition processing circuitry;
(c) a second subkey column addition processing circuitry; and
(d) a secret equi-join processing circuitry, wherein
  (a) the storage stores
    a first concealed table that is concealed information of a first table including a first key column having a plurality of first keys and a first arbitrary element column having a plurality of first arbitrary elements, and
    a second concealed table that is concealed information of a second table including a second key column having a plurality of second keys and a second arbitrary element column having a plurality of second arbitrary elements,
  (b) the first subkey column addition processing circuitry obtains, by secure computation using the first concealed table, a first concealed additional table that is concealed information of a first additional table which is obtained by adding a first subkey column to the first table,
  the first subkey column has a plurality of first subkeys,
  each of the first keys is associated with any of the first subkeys,
  a maximum value of a number of the first keys of same value contained in the first key column is KL,
  KL is an integer of 2 or more,
  the first keys of the same value are associated with the first subkeys of different values,
  (c) the second subkey column addition processing circuitry obtains, by secure computation using the second concealed table, a second concealed additional table that is concealed information of a second additional table which is obtained by adding a second subkey column to a third table,
  respective records in the second table include the respective second keys and the respective second arbitrary elements,
  the third table is a table which is obtained by adding a plurality of copied records, obtained by copying each of the records in the second table K times, to the second table, and K≥KL,
  the third table includes a third key column having a plurality of third keys that include the second key and a copy of the second key, and a third arbitrary element column having a plurality of third arbitrary elements that include the second arbitrary element and a copy of the second arbitrary element,
  the second subkey column contains a plurality of second subkeys,
  each of the third keys is associated with any of the second subkeys,
  when the third key column contains the third keys representing a same common value as any of the first keys, at least some of the third keys representing the common value are associated with the second subkeys of same value as the first subkeys associated with the first keys representing the common value, and
  (d) the secret equi-join processing circuitry obtains, by secure computation using the first concealed additional table and the second concealed additional table, a concealed joined table that is concealed information of a joined table which is obtained by equi-joining the first additional table and the second additional table, using a pair of the first key and the first subkey as a key attribute of the first additional table and a pair of the third key and the second subkey as a key attribute of the second additional table.

2. The secret equi-join device according to claim 1, wherein when the third key column contains the third keys representing the common value, a value of any of the first subkeys associated with the first keys representing the common value is same value as any of the second subkeys associated with the third keys representing the common value.

3. The secret equi-join device according to claim 1, wherein $$K=KL.$$

4. The secret equi-join device according to claim 1, wherein
a maximum value of a number of the second keys of same value contained in the second key column is equal to or less than the maximum value of the number of the first keys of the same value contained in the first key column.

5. The secret equi-join device according to claim 1, further comprising:
(e) a table resetting processing circuitry that, when a maximum value of a number of the second keys of same value contained in the second key column is larger than a maximum value of the number of the first keys of same value contained in the first key column, swaps the first concealed table with the second concealed table, and
resets the first table including the first key column having the first key and the first arbitrary element column having the first arbitrary element and the second table including the second key column having the second key and the second arbitrary element column having the second arbitrary element as the second table including the second key column having the second key and the second arbitrary element column having the second arbitrary element and the first table including the first key column having the first key and the first arbitrary element column having the first arbitrary element, respectively.

6. The secret equi-join device according to claim 1, wherein
a number of records in the first table is LRN,
a number of records in the second table is RRN,
LRN and RRN are integers of 2 or more,
(b) j=0, . . . , LRN−1,
a j-th first key in the first key column is TL.Key$_j$,
the j-th first subkey in the first subkey column is TL$_s$.S$_j$,
when j=0, TL$_s$.S$_j$=0, when j>0 and $TL.Key_j \neq TL.Key_{j-1}$, $TL_s.S_j=0$,
when j>0 and $TL.Key_j = TL.Key_{j-1}$, $TL_s.S_j = TL_s.S_{j-1}+1$,
(c) i=0, ..., RRN*K−1,
a quotient of i divided by K is idk,
imk=i−idk*K
an idk-th record in the second table is $TR_{idk}$,
an i-th record in the third table is $TR_{ci}$,
$TR_{ci}=TR_{idk}$,
the i-th second subkey in the second subkey column is $TRs.S_i$, and
$TRs.S_i$=imk.

7. A secret equi-join method of a secret equi-join device, the secret equi-join method comprising:
(a) a storage step;
(b) a first subkey column addition step;
(c) a second subkey column addition step; and
(d) a secret equi-join step, wherein
  (a) the storage step is a step of storing, into a storage,
    a first concealed table that is concealed information of a first table including a first key column having a plurality of first keys and a first arbitrary element column having a plurality of first arbitrary elements, and
    a second concealed table that is concealed information of a second table including a second key column having a plurality of second keys and a second arbitrary element column having a plurality of second arbitrary elements,
  (b) the first subkey column addition step is a step of obtaining, by secure computation using the first concealed table, a first concealed additional table that is concealed information of a first additional table which is obtained by adding a first subkey column to the first table,
  the first subkey column has a plurality of first subkeys,
  each of the first keys is associated with any of the first subkeys,
  a maximum value of a number of the first keys of same value contained in the first key column is KL,
  KL is an integer of 2 or more,
  the first keys of the same value are associated with the first subkeys of different values,
  (c) the second subkey column addition step is a step of obtaining, by secure computation using the second concealed table, a second concealed additional table that is concealed information of a second additional table which is obtained by adding a second subkey column to a third table,
  respective records in the second table include the respective second keys and the respective second arbitrary elements,
  the third table is a table which is obtained by adding a plurality of copied records, obtained by copying each of the records in the second table K times, to the second table, and K≥KL,
  the third table includes a third key column having a plurality of third keys that include the second key and a copy of the second key, and a third arbitrary element column having a plurality of third arbitrary elements that include the second arbitrary element and a copy of the second arbitrary element,
  the second subkey column contains a plurality of second subkeys,
  each of the third keys is associated with any of the second subkeys,
  when the third key column contains the third keys representing a same common value as any of the first keys, at least some of the third keys representing the common value are associated with the second subkeys of same value as the first subkeys associated with the first keys representing the common value, and
  (d) the secret equi-join step is a step of a obtaining, by secure computation using the first concealed additional table and the second concealed additional table, a concealed joined table that is concealed information of a joined table which is obtained by equi-joining the first additional table and the second additional table, using a pair of the first key and the first subkey as a key attribute of the first additional table and a pair of the third key and the second subkey as a key attribute of the second additional table.

8. A non-transitory computer-readable recording medium storing a program for causing a computer to function as the secret equi-join device according to claim 1.

* * * * *